United States Patent Office 3,503,998
Patented Mar. 31, 1970

3,503,998
REACTION PRODUCTS OF DIAMINES AND THE MONOACID CHLORIDE OF MALEOPIMARIC ACID
Walter H. Schuller and Ray V. Lawrence, Lake City, Fla., assignors to the United States of America as represented by the Secretary of Agriculture
No Drawing. Original application Dec. 2, 1966, Ser No. 599,346. Divided and this application Nov. 13, 1968, Ser. No. 794,450
Int. Cl. C07d 5/46
U.S. Cl. 260—346.3
3 Claims

ABSTRACT OF THE DISCLOSURE

The invention disclosed herein relates to new amide compounds and the hydrochloride salts thereof. The new amide compounds are prepared by reacting diamines and the monoacid chloride of maleopimaric acid in mole ratios of one to one and one to two, respectively.

This application is a division of application bearing Ser. No. 599,346, filed Dec. 2, 1966.

A non-exclusive, irrevocable, royalty free license in the invention herein described, throughout the world for all purposes of the United States Government, with the power to grant sublicenses for such purposes, is hereby granted to the Government of the United States of America.

It is an object of this invention to describe our improved process for the preparation of the monoacid chloride of maleopimaric acid (MAC).

It is another object of this invention to describe the preparation of new compositions of matter prepared by reacting one mole of various diamines with two moles of MAC to give bisamides. These bisamides are fused in mole to mole ratios with various diamines to give head-to-head and tail-to-tail linked, new polyimide-polyamide resins.

It is still another object of this invention to describe the preparation of new random linked polyimide-polyamide resins by the fusion of MAC with various diamines in mole ratios of 1 to 1.

It is a further object of this invention to describe the preparation of new amide-amine-hydrochloride salts of maleopimaric acid by reaction of MAC with a large excess of various diamines. The fusion of this product yields a new head to-tail linked polyimide-polyamide resin.

It is a further object of this invention to describe the preparation of new polyimide-polyamide resins by the reaction of 1 mole of diamine with 1 mole of a triester prepared by reacting MAC with 3 moles of methanol.

Maleopimaric acid is the well known reaction product of maleic anhydride and any of the four conjugated dienic resin acids, namely levopimaric, neoabietic, palustric and abietic. The first named acid will react at room temperature; the other acids require heat. Gum rosin can be maleated directly and all of the conjugated dienic resin acids present—which constitute the major portion of the composition of gum rosin—will be converted to maleopimaric acid, the structure of which is as follows:

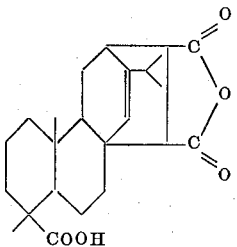

In 1946, M. M. Graff [J. Am. Chem. Soc., 68, 1937 (1946)] described the preparation of a crude mono-acid chloride of maleopimaric acid via reaction of maleopimaric acid with phosphorous trichloride. The product was not isolated and was not a pure compound. It decomposed on standing for even short periods of time. We have reacted maleopimaric acid with thionyl chloride and prepared the monoacid chloride of maleopimaric acid in the pure state and fully characterized the compound. When pure, the compound is stable for months, at room temperature. Its structure is:

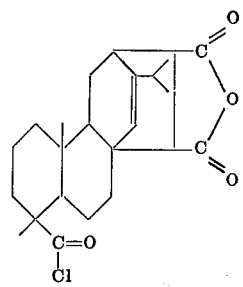

Maleated gum rosin can also be converted to the acid chloride by reaction with thionyl chloride and used in place of MAC throughout. This provides a much cheaper raw material.

When 2 moles of MAC are reacted with 1 mole of various diamines, new compositions of matter called bisamides are formed, the structure of which are:

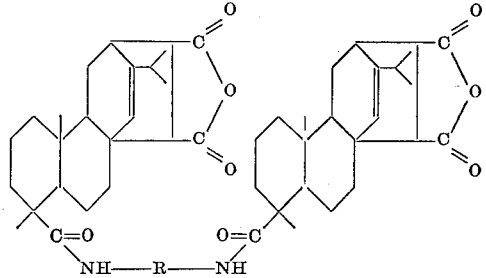

A series of bisamides were prepared employing the following diamines: 1,2-ethanediamine, 4,4'-oxydianiline, 1,6-hexanediamine, 1,3-propanediamine, para-phenylenediamine, meta-phenylenediamine, and 4,4'-methylenedianiline. These bisamides are either prepared by the pyridine method or by a modified Scholten-Baumann procedure. Some of the bisamides were prepared by both procedures and gave the same product. In both processes, the temperature range used is from 0° C. to room temperature.

The fusion of these bisamides (1 mole) with 1 mole of various diamines yields new polyimide-polyamide resins. These have head-to-head, tail-to-tail linkages. The fusions are carried out in a test tube with a stream of nitrogen introduced under the melt to help remove the water formed in the reaction. A thermometer is inserted in the melt to determine the fusion temperature. Heat is supplied either by an open flame from a Bunsen burner or by a fluidized sand bath. Temperatures of fusion are in the range of 225° C. to 375° C. with the preferred temperature range being about 290°–350° C. The time of fusion over an open Bunsen flame varies from to 2 to 20 minutes with the preferred range of about 2–8 minutes. On cooling the polymers are hard glassy solids. Softening points range up to 340° C. via a capillary tube in an oil bath. Solvent resistance is high with most of the polymers being insoluble in water, conc. hydrochloric acid, 10% aqueous sodium hydroxide, benzene, isooctane, pentane, acetonitrile, ethyl acetate, dioxane, glacial acetic acid, carbon tetrachloride, ethyl alcohol, methyl alcohol, and so forth. Molecular weights are usually determined via titration of anhydride and groups with base in acetone. Molecular weights via this method range from 2,000 to 8,500. The resulting polyimide-polyamides can be cast as films from chloroform solution. The films are hard and tough and resistant to water and other solvents. Also, *fibers* can be cold drawn from the hot melts. These fibers offer a potential basis for the preparation of a new type of synthetic fibr.

The reaction of 1 mol of MAC with a large excess (e.g. 10 moles) of a diamine in a modified Scholten-Baumann procedure followed by acidification with hydrochloric acid yields the new amide-amine-hydrochloride salt of the following structure:

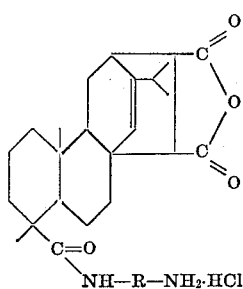

Fusion of this product gives a new head-to-tail linked polyimide-polyamide resin. Again, the fusion is done in a test tube as described earlier and the nitrogen sweep serves to remove hydrogen chloride gas as well as water of reaction. The fusion temperatures are about 290–370° C. with a preferred range of about 320–345° C., measured by means of a thermometer in the melt, with heat supplied by the open flame of a Bunsen burner. The resin obtained is similar to the resin obtained from the fusion of the bisamides described above. A film cast from chloroform on steel exhibited a Sward hardness of 54 and showed excellent resistance to water and good adhesion to steel.

The fusion of 1 mole of MAC with 1 mole of various diamines (and triamines) results in the formation of *random-linked* polyimide-polyamide resins. Again, the fusion is carried out as described above, the nitrogen stream being useful to remove hydrogen chloride and water of reaction. Fusion temperatures, as measured by a thermometer in the melt over an open Bunsen flame, range from 225° to 375° with the preferred range being 290–325° C. The time of fusion over an open Bunsen flame varies from 2 to 20 minutes with the preferred range about 3–8 minutes. The resins resemble those obtained from the bisamides. They are hard, glassy solids. They are insoluble in all the solvents previously tested. The molecular weights, by the method previously described, vary from 2,000 to 18,000. Films can be cast from chloroform solution, which are hard and tough and very resistant to water and other solvents. Fibers can be cold-drawn from hot melts offering a new type of synthetic fiber material. The various amines reacted with MAC are: 4,4-oxydianiline, 1,6 - hexanediamine, 3,3 - iminobispropylamine, 1,2-ethanediamine, 1,3-propanediamine, para-phenylenediamine, meta-phenylenediamine, and 4,4'-methylenedianiline.

The reaction of MAC with an excess of methanol yields a triester of the following structure:

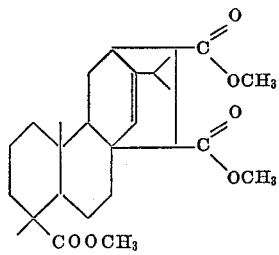

Fusion of this triester with various diamines yields a polyimide-polyamide resin similar in properties to those obtained from the bisamides. The fusion time required is longer, being on the order of 1–3 hours in a fluidized sand bath at about 280–310° C. The resins can be cold drawn from the hot melt to give fibers, forming the basis for a new type of synthetic fiber.

EXAMPLE 1

To 30 ml. of trionyl chloride was added 20 g. of maleopimaric acid and stirred until all solids are in solution. Much gas was liberated during the process. After standing overnight at room temperature, the bulk of the excess thionyl chloride was stripped off under reduced pressure. Stripping was discontinued when the material in the pot formed a slush. This was filtered on a sintered glass funnel, triturated with dry ether, and washed with dry ether; yield 16.8 g. (80%); equiv. wt. 105.4; $[\alpha]_D$ —44.45 (c. 235 in chloroform) The monoacid chloride of maleopimaric acid (MAC) was recrystallized twice from dry benzene and exhibited no change in optical rotation. The recrystallized product exhibited $[\alpha]_D^{25}$ —44.2 (c. 2.24 in chloroform); M.P. 190° with dec. and evolution of gas; no characteristic absorption from 220–320 mm.; $\lambda_{max}$ (Nujol mull) 5.44$\mu$ (m.) (anhydride), 5.63$\mu$ (s.) (anhydride), 8.17$\mu$ (s.) (anhydride). (Maleopimaric acid exhibits $\lambda_{max}$ (Nujol mull) 5.43$\mu$ (m.), 5.63$\mu$ (s.) and 8.18$\mu$ (s.)).

*Analysis.*—Calcd. for $C_{24}H_{31}O_4Cl$ (percent): C, 68.80; H, 7.46; Cl, 8.46; O, 15.28; equiv. wt. 104.7. Found (percent): C, 68.72; H, 739; Cl, 8.36; O, 15.14; equiv. wt. 104.9.

The structure of this compound is:

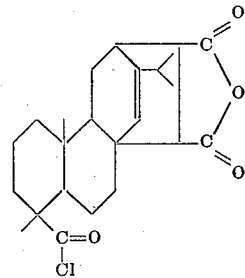

EXAMPLE 2

A mixture of 200 g. (0.66 mole) of WG gum rosin and 45 g. (0.46 mole) of maleic anhydride were mixed and heated together under nitrogen with stirring for one hour at 200° C. At the end of this time, the ultraviolet absorption spectrum showed that all the conjugated dienic resin acids present were maleated. A sample of the maleated rosin weighing 138 g. was dissolved in 300 ml. of thionyl chloride with stirring. A vigorous evolution of gas occurred. Twenty-four hours later the solution was stripped on a steam bath under reduced pressure to a syrup. An excess of isooctane was then added to the syrup with stirring and allowed to stand overnight. In the morning, the mixture was rubbed in a mortar, collected by filtration, washed with more isooctane and dried under reduced pressure to give the monoacid chloride of maleated gum rosin as a brown powder; equivalent weight; found, 119; theory, 105. This maleated acid chloride can be substituted for MAC in all of the following examples wherever MAC is used.

EXAMPLE 3

To a solution of 0.34 ml. (0.005 mole) of 1,2-ethanediamine in 10 ml. of dioxane plus 18 ml. of 10% sodium hydroxide in water was added dropwise a solution of 4.9 g. (0.01 mole) of MAC in 40 ml. of dioxane. Magnetic stirring was maintained plus water bath cooling. After one hour, an excess of 3 N hydrochloric acid was added. An oil formed. The supernatant was decanted and fresh water added. The oil solidified. It was triturated with 1 N hydrochloric acid and later washed thoroughly; yield 2.50 g.; neut. equiv. for the bisamide of maleopimaric acid, 205; theory 206. The structure of this compound is as follows:

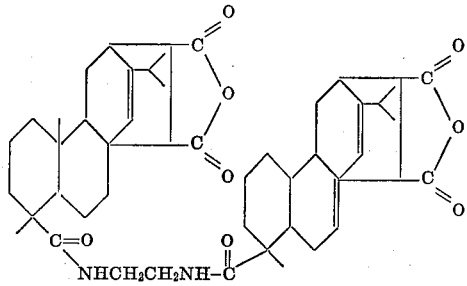

EXAMPLE 4

A solution of 2.0 g. (0.01 mole) of 4,4'-oxybisaniline (0.01 mole) in 10 ml. of pyridine was added dropwise to a solution of 8.4 g. (0.02 mole) of MAC in pyridine at 5–10° C. with stirring. After 1 hour at room temperature an excess of 3 N hydrochloric acid was added plus water. The solid was collected and dried, weight 9.2 g. The equivalent weight was 283; theory 281.

EXAMPLE 5

A solution of 0.58 g. (0.005 mole) 1,6-hexanediamine in 5 ml. of pyridine was added dropwise to 4.19 g. (0.01 mole) of MAC in 10 ml. of pyridine with magnetic stirring and water bath cooling. After 1 hour in solution was filtered and an excess of 3 N hydrochloric acid was added. The white precipitate which formed was collected, triturated with 3 N hydrochloric acid, washed thoroughly with water and dried; yield 3.30 g.

EXAMPLE 6

A solution of 1,6-hexanediamine (0.58 g.; 0.005 mole) in 20 ml. of dioxane plus 18 ml. of 10% sodium hydroxide was added dropwise to a solution of 4.19 g. (0.01 mole) of MAC in 40 ml. of dioxane with ice bath cooling and magnetic stirring. After one hour, an excess of 3 N hydrochloric acid was added. The supernatant was decanted and fresh water added. The gummy solid solidified; washed thoroughly with water; yield 3.81 g.; test for chloride is negative. The infrared spectrum exhibited $\lambda_{max}$ (Nujol mull) 2.98$\mu$ (m.) amide, 5.44$\mu$ (m.) anhydride, 5.65$\mu$ (s.) anhydride, 8.18$\mu$ (s.) anhydride.

EXAMPLE 7

A solution of 0.37 g. (0.005 mole) of redistilled 1,3-propanediamine in 5 ml. of dioxane plus 18 ml. of 10% aqueous sodium hydroxide was added to a solution of 4.19 g. (0.01 mole) of MAC in 40 ml. of dioxane at 20–25° with magnetic stirring and external cooling. One hour after the last addition, an excess of 3 N hydrochloric acid was added. The solid was triturated in 3 N hydrochloric acid and washed thoroughly in water; yield 3.04 g.; equivalent weight, found 194; theory 210.

EXAMPLE 8

To a solution of 4.19 g. (0.01 mole) of MAC in 25 ml. of pyridine was added dropwise, during magnetic stirring, a solution of 0.54 g. (0.005 mole) of para-phenylenediamine. One hour after the last addition, an excess of water was added. The solid was collected, triturated with 3 N hydrochloric acid, and washed thoroughly with water; yield 3.92 g.; equivalent weight, found 210; theory 218.

EXAMPLE 9

To a solution of 4.19 g. (0.01 mole) of MAC in 15 ml. of pyridine was added a solution of 0.54 g. (0.005 mole) of meta-phenylenediamine in 10 ml. of pyridine, slowly, with ice bath cooling. A slush formed. Pyridine (35 ml.) was added and after one hour at room temperature, an excess of 3 N hydrochloric acid was added with cooling. The precipitate that formed was collected and washed thoroughly with water; yield 4.0 g.; equiv. wt.: found 219; theory 219 for the bisamide.

EXAMPLE 10

A solution of 0.99 g. (0.005 mole) of 4,4'-methylenedianiline in 10 ml. of dioxane plus 18 ml. of 10% aqueous sodium hydroxide was added slowly (with constant shaking), to a solution of 4.19 g. (0.01 mole) of MAC in 40 ml. of dioxane during magnetic stirring and with cooling. After 1 hour at room temperature an excess of 3 N hydrochloric acid was added, the solid collected, washed with water, then with 3 N hydrochloric acid and then thoroughly with water; yield 4.27 g. equiv. wt.: found 244; theory 241 for the bisamide.

EXAMPLE 11

A solution of .99 g. (0.005 mole) of 4,4'-methylenedianiline in 15 ml. of pyridine was added slowly with cooling and stirring to a solution of 4.19 g. (0.01 mole) of MAC in 15 ml. of pyridine. After one hour at room temperature an excess of water was added, the solid collected, triturated with 3 N hydrochloric acid, then washed thoroughly with water; yield 4.43 g. equivalent weight: found 247; theory 241 for bisamide.

EXAMPLE 12

To a solution of 0.41 g. (0.00354 mole) of 1,6-hexanediamine in 35 ml. of dry dimethyl formamide was slowly added 3.11 g. (0.00354 mole) of the bisamide of MAC and 1,6-hexanediamine with stirring. The solution was boiled until two-thirds of the solvent had been removed. The clear solution was placed in an aluminum cup in an oven and heated to 100° C., then to 150° C. at which point the solvent began to boil off. At this point, a spatula could be dipped into the melt and *fibers* cold-drawn from the melt.

EXAMPLE 13

A mixture of 0.881 g. (0.001 mole) of the bisamide of MAC with 1,6-hexanediamine and 0.116 g. (0.001 mole) of 1,6-hexanediamine was mortared together and charged to a test tube 150 mm. long and 17 mm. in inside diameter. The test tube was equipped with a thermometer extending to the bottom of the tube. A capillary gas delivery tube extended below the level of the melt, carrying a rapid stream of nitrogen. The test tube was heated over an open Bunsen burner flame. Fusion at 320° C. was carried out for 3 minutes. The polyamide-polyimide obtained was a hard glassy solid. The polymer exhibited $\lambda_{max}$ (Nujol mull) 2.98$\mu$ (m.) (amide), 5.67$\mu$ (m.) (imide), 5.88$\mu$ (s.) (shoulder) (imide), 13.93$\mu$ (m.) (imide). The molecular weight as determined by titration with base in acetone was about 2140; softening point 190° C.; insoluble in 40% aqueous potassium hydroxide, methyl alcohol, benzene, and pentane. A film was cast on glass from chloroform. A light colored, tough film was obtained.

EXAMPLE 14

A mixture of 0.839 g. (0.001 mole) of the bisamide of MAC with 1,3-propanediamine and with 0.116 g. (0.001 mole) of 1,6-hexanediamine was mortared together and fused at 320° C. for 3 minutes, as described in Example 13. The molecular weight by titration with base in acetone, was about 2440; softening point 190° C.; insoluble in pentane, acetonitrile, methyl alcohol, 40% aqueous sodium hydroxide and concentrated hydrocholoric acid. A film cast on glass from chloroform was tough and clear with excellent adhesion to glass.

EXAMPLE 15

A mixture of 0.825 g. (0.001 mole) of the bisamide of 1,2-ethanediamine with MAC and 0.116 g. (0.001 mole) of 1,6-hexanediamine was mortared together and fused at 320° C. for 3 minutes, as described in Example 13. Softening point of the polyimide-polyamide was 180° C.; insoluble in benzene, 40% potassium hydroxide, pentane, methanol, ethyl acetate; molecular weight via titration with base in acetone was 2480. A film was cast on glass from chloroform and was hard, tough and clear.

EXAMPLE 16

A mixture of the bisamide of MAC and ethanediamine (0.83 g.; 0.001 mole) and 0.11 g. of para-phenylenediamine was mortared together and fused at 270° C. for 4 minutes as described in Example 13. The polyimide-polyamide was a hard, glassy solid on cooling; molecular weight by titration with base in acetone was about 4600; softening point 290° C.; insoluble in benzene, 3 N hydrocholoric acid 40% potassium hydroxide, pentane, methanol, and acetonitrile.

EXAMPLE 17

The bisamide of MAC and para-phenylenediamine (0.873 g.; 0.001 mole) and 0.108 g. of meta-phenylenediamine (0.001 mole) were mortared together and fused at 320° C. for 4 minutes as described in Example 13. The polyimide-polyamide was a hard glassy solid; molecular weight by titration in acetone with base was about 2160; softening point 230° C., insoluble in glacial acetic acid, 40% potassium hydroxide, concentrated hydrochloric acid, benzene, methanol, pentane, ethyl acetate and water.

EXAMPLE 18

A mixture of 0.116 g. (0.001 mole) of 1,6-hexanediamine together with the bisamide of MAC (0.873 g.; 0.001 mole) and meta-phenylenediamine was fused at 320° C. for 3 minutes as described in Example 13. The polyimide-polyamide was obtained as a hard glassy resin; molecular weight by titration with base in acetone 2840; softening point 170°; insoluble in methanol, benzene, pentane, 40% aqueous sodium hydroxide, conc. hydrochloric acid and water.

EXAMPLE 19

A mixture of 0.198 g. (0.001 mole) of 4,4'-methylenedianiline and of 0.963 g. (0.001 mole) of the bisamide of MAC with 4,4'-methylenedianiline is mortared together and fused at 320° C. for 3 minutes as described in Example 13. The polyamide-polyimide is a hard glassy solid and exhibits a molecular weight of about 4200 by titration with base in acetone; softening point of 225° C.; insoluble in benzene, glacial acetic acid, methanol, concentrated hydrochloric acid, pentane, acetonitrile, and 40% aqueous potassium hydroxide.

EXAMPLE 20

A mixture of 0.116 g. (0.001 mole) of 1,6-hexanediamine is mixed with 0.873 g. (0.001 mole) of the bisamide of MAC and para-phenylenediamine and fused at 320° C. for 3 minutes as described in Example 13. A hard glassy polyamide-polyimide was obtained; softening point 255° C.; insoluble in pentane, methanol, benzene, and 40% aqueous potassium hydroxide; molecular weight by titration in acetone with base was about 2600.

EXAMPLE 21

A mixture of 0.116 g. (0.001 mole) of 1,6-hexanediamine and 0.963 g. (0.001 mole) of the bisamide of MAC and 4,4'-methylenedianiline is motared together and fused at 320° C. for 2 minutes as described in Example 13. A hard glassy polyamide-polyimide was obtained; molecular weight by titration with base in acetone was about 4200; softening point 250° C.; insoluble in 40% aqueous potassium hydroxide, benzene, methyl alcohol, pentane, and glacial acetic acid.

EXAMPLE 22

A mixture of 0.964 g. (0.001 mole) of the bisamide of MAC and 4,4'-oxydianiline plus 0.116 g. (0.001 mole) of 1,6-hexanediamine was fused as described in Example 13 at 320° C. for 4 minutes. The molecular weight (titration with base in acetone) was 8440; insoluble in isooctane, methanol, and benzene; softening point 194° C.

EXAMPLE 23

A mixture of 0.964 g. (0.001 mole) of the bisamide 4,4'-oxydianiline and MAC and 0.200 g. (0.001 mole) of 4,4'-oxydianiline was fused in a test tube as described in Example 13 at 330° C. for 3 minutes. The molecular weight (titration with base in acetone) was 4980; softening point 209° C.; insoluble in isooctane, methanol and benzene.

EXAMPLE 24

To a solution of 11.6 g. of 1,6-hexanediamine (0.10 mole) in 40 ml. of dioxane and 18 ml. of 10% aqueous sodium hydroxide was added dropwise with stirring and at 0–10° C. a solution of 4.19 g. (0.01 mole) of MAC in 40 ml. of dioxane. To the mixture, after 1 hour at room temperature, was added an excess of 3 N hydrochloric acid with cooling. The precipitate was collected, weight 1.67 g., equiv. wt. found 182, theory 178, test for chloride ion positive; $[\alpha]_D$ —7.8° (c.=0.32 in chloroform). The structure of the above compound is:

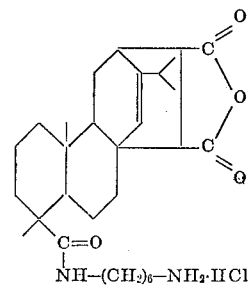

EXAMPLE 25

A portion of the amide-amine-hydrochloride prepared in Example 24 was placed in a test tube (150 mm. long and 17 mm. in inside diameter) equipped with a thermometer extending to the bottom of the tube, and a capillary gas delivery tube which extended below the level of the melt and through which passed a rapid stream of nitrogen. The test tube was heated with a Bunsen burner flame. The compound was fused at 290° C. for 2 minutes, 320–330° C. for 3 minutes and finaly at 335–345° C. for 3 minutes under a heavy stream of nitrogen. The resulting polyimide-polyamide had a *head-to-tail* structure. It was a hard glass on cooling; molecular weight via titration with base in acetone 2320; the polymer was insoluble in methanol, isooctane, and ethyl acetate. It had a softening point of 148° C. A portion was dissolved in chloroform and a film cast on a cold rolled steel plate. A good film was obtained. It exhibited good adhesion to steel. It had a Sward hardness of 54. It showed good resistance to cold water, no damage being observed on standing overnight in contact with water.

EXAMPLE 26

A portion of a mixture of 4.19 g. (0.01 mole) of MAC and 2.00 g. (0.01 mole) of 4,4'-oxydianiline was placed in a test tube equipped as in Example 13 and fused at 285° C. for 8 minutes under a nitrogen stream and then brought to 310° C. for 1 minute. A glassy polyimide-polyamide was obtained on cooling; molecular weight via titration with base in acetone, 5500. The polymer was insoluble in acetonitrile, benzene, ethyl acetate, pentane, methanol, dioxane, and glacial acetic acid.

A portion of the same mixture of MAC and diamine was fused as described above except that a fluidized sand bath was used as a source of heat. Fusion was carried out under a nitrogen stream at 350° C. for 2 hours. By dipping a glass rod into the hot melt, *fibers* could be repeatedly cold drawn by touching the melt to the edge of the tube and pulling.

EXAMPLE 27

A portion of a mixture of 4.19 g. (0.01 mole) of MAC and 1.16 g. (0.01 mole) of 1,6-hexanediamine was heated in a test tube (150 mm. long and 17 mm. in inside diameter) containing a thermometer, at 320° C. for about 4 minutes over a Bunsen burner flame as described in Example 13. A constant stream of nitrogen was introduced below the surface of the melt through a capillary. On cooling, a hard, tough glassy polyimide-polyamide was obtained which had a molecular weight of about 5800 based on a titration with base in acetone. The polymer exhibited a softening point of 205–210° C. It was insoluble in methanol, benzene, acetone, pentane, ethyl acetate, 40% aqueous potassium hydroxide and concentrated hydrochloric acid. The infrared absorption curve exhibited $\lambda_{max}$ (Nujol mull) 298$\mu$ (m.) amide; 5.66$\mu$ (m.) imide; 5.85$\mu$ (s.) (shoulder) imide, 13,92$\mu$ (m.) imide. No band at 5.4$\mu$ (no anhydride). A film was cast on glass of the polymer from chloroform solution. The film was glassy, hard and tough, exhibited good adhesion to glass, and was very resistant to water.

EXAMPLE 28

A mixture of 4.19 g. (0.01 mole) of MAC and 0.877 g. (0.0067 mole) of 3,3′-iminobispropylamine was mortared together. The mixture was heated as described in Example 13 to 290° C. for 3 minutes. On cooling a hard, glassy polyamide-polyimide was obtained, insoluble in benzene, pentane, and 40% aqueous potassium hydroxide. The polymer exhibited a softening point of 190° C. A film was cast from chloroform solution on glass. A tough glassy film was obtained with good adhesion to glass.

EXAMPLE 29

A mixture of MAC (0.01 mole; 4.10 g.) and 1,2-ethanediamine (0.01 mole; 0.67 ml.) was fused as described in Example 13, by heating at 320° C. for about 5 minutes under nitrogen. The molecular weight as determined by titration with base in acetone was about 4000. The hard, glassy polyamide-polyimide had a softening point of 290° C. It was insoluble in acetonitrile, methyl alcohol, carbon tetrachloride, ethyl acetate, benzene, isooctane, 3 N aqueous hydrochloric acid and 10% aqueous sodium hydroxide.

EXAMPLE 30

A mixture of 4.19 g. (0.01 mole) of MAC and 0.82 ml. (0.01 mole) of 1,3-propanediamine was fused as described in Example 13 at 320° C. for 2 minutes. The resulting polyamide-polyimide has a softening point of 240° C., and was insoluble in pentane, benzene, acetonitrile and methyl alcohol.

EXAMPLE 31

A mixture of 4.19 g. (0.01 mole) of MAC and 1.08 g. (0.01 mole) of para-phenylenediamine was fused as described in Example 13 at 320° C. for about eight minutes. The molecular weight of the resulting polyimide-polyamide via titration with base in acetone was 7520, and its softening point was 335° C. The polyamide-polyimide was insoluble in concentrated hydrochloric acid, 50% aqueous sodium hydroxide, ethyl acetate, benzene, water, ethyl alcohol, acetonitrile, carbon tetrachloride, and dioxane. This polymer could be cold drawn into fibers from a hot melt.

EXAMPLE 32

A mixture of 4.19 g. (0.01 mole) of MAC and 1.08 g. (0.01 mole) of meta-phenylenediamine is heated as described in Example 13 at 315° C. for about five minutes. The hard glassy polyimide-polyamide that was formed exhibited a softening point of 262° C. It was insoluble in 3 N hydrochloric acid, water 40% aqueous potassium hydroxide, ethyl alcohol, benzene, pentane, glacial acetic acid, and acetonitrile. The polymer had a molecular weight of about 6620 via titration with base in acetone.

EXAMPLE 33

A mixture of 4.19 g. (0.01 mole) of MAC and 1.98 g. (0.01 mole) of 4,4′-methylenedianiline was fused together as described in Example 13 at 320° C. for about five minutes. A hard glassy polyamide-polyimide was obtained on cooling. The polymer exhibited a softening point of 360° C. It is insoluble in benzene, carbon tetrachloride, ethyl acetate, pentane, ethyl alcohol, water, acetonitrile, glacial acetic acid, dioxane, 10% sodium hydroxide and 3 N hydrochloric acid. The polymer exhibited a molecular weight as determined by titration with base in acetone of 11,000; $n_{int}$=0.09 (c.=1.0, 30° C., DMF); nitrogen analysis 5.09% (theory for polyimide-amide 4.98%). A sample of the polymer was fractionated by adding benzene to a chloroform solution. The first fraction (13%) exhibited $n_{int}$ 0.114 (c.=1.0, 30° C., DMF). The second fraction [31%; $n_{int}$ 0.089 (c.=1.0, 30° C., DMF)] exhibited a molecular weight of 6072 via vapor pressure osmometry; nitrogen analysis 4.99% (theory for polyimide-amide 4.98%). The infrared spectrum (Nujol mull) exhibited bands at 3$\mu$ (s.) (amide), 5.65 (m.) (imide), 5.88 (s.) (imide), 6.11 (s.) (amide), 6.62 (m.) (amide), 13.92 (m.) (imide) $\mu$.

EXAMPLE 34

A solution of 8 g. of MAC in 150 ml. of absolute methanol was refluxed three hours, stripped under reduced pressure to dryness, the residue taken up in ether, the ether washed with water until neutral, the solvent then removed under reduced pressure and the triester dried.

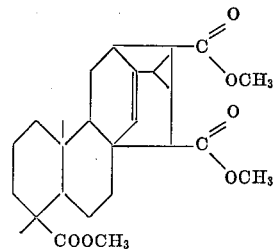

EXAMPLE 35

A mixture of 4.47 g. (0.01 mole) of the trimethyl ester prepared in Example 34 and 1.16 g. (0.01 mole) of 1,6-hexanediamine was mortared together and a portion placed in a test tube equipped as in Example 13. The test tube placed in a fluidized sand bath and fused at 280° C. for 1 hour under a vigorous stream of nitrogen. The polymer was obtained as a light yellow glassy solid on cooling. It exhibited the following infrared maxima: (Nujol mull) $\lambda_{max}$ 3$\mu$, 5.67, 5.83, 5.90, 5.95, 11.90, indicating the presence of amide and imide bands but no anhydride (no bands in 5.45 region). When the polymer was dissolved in chloroform and cast on a glass plate it gave a good film, very pale yellow in color, of Sward hardness of 46. The film was completely resistant to water for over four hours. On standing overnight in contact with water a white coloration appeared which disappeared after standing one-half hour in the absence of water.

EXAMPLE 36

A mixture of 2.24 g. (0.005 mole) of the triester of MAC prepared as in Example 34 and 1.00 g. (.005 mole) of 4,4-oxydianiline was prepared and a portion of it was placed in a test tube equipped as in Example 13 and placed in a fluidized sand bath where it was fused at 285° C. for 1.5 hours and then at 310° C. for 1 hour. The hot product at this point could be *cold drawn* into *fibers* by inserting a glass rod into the melt, touching the lip of the test tube with the polymer and pulling.

The polymer on cooling exhibited a softening point of 205° C. and was insoluble in isooctane, ethyl acetate, benzene and methanol.

EXAMPLE 37

A solution of 8.11 g. (0.02 mole) of MAC in 36 ml. of dry 1-methyl-2-pyrrolidone was added slowly at 10–15° C. to a solution of 2.32 g. (0.02 mole) of 1,6-hexanediamine in 27 ml. of 1-methyl-2-pyrrolidone in which was dispersed 2.12 g. (0.02 mole) of finely divided anhydrous sodium carbonate. Vigorous stirring was supplied. The solution was allowed to stand at room temperature for 30 minutes and filtered; $n_{int}$ 0.07 at 30° C. A portion was diluted with water. The white precipitate was collected and found to be insoluble in DMF, acetone, and concentrated alkali and acid, molecular weight via vapor pressure osmometry 3753; nitrogen analysis 5.83% (calculated for poly (half amide) 5.62%). A portion of the 1-methyl-2-pyrrolidone solution was heated to 190° C. and cooled. The polymer was precipitated with water, $\lambda_{max}$ 3.0 (w.) (amide), 5.64 (m.) (imide), 5.88 (s.) (shoulder) (imide), 6.07 (s.) (amide), 6.56$\mu$ (m.) (amide).

We claim:

1. A compound represented by the structure:

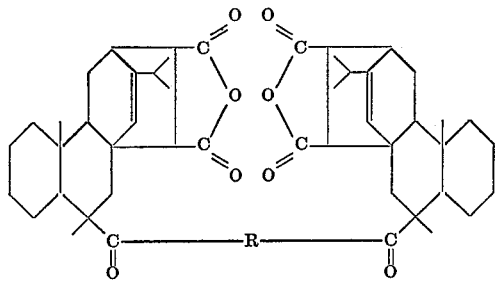

wherein R is selected from the group consisting of:

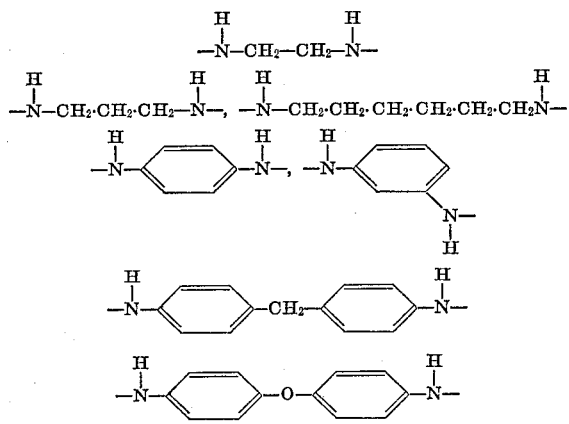

2. A compound represented by the structure:

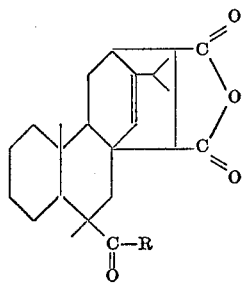

wherein R is selected from the group consisting of

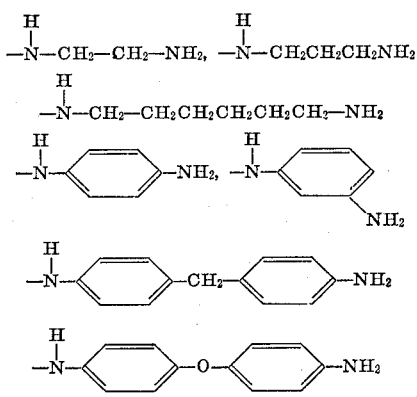

3. A compound represented by the structure:

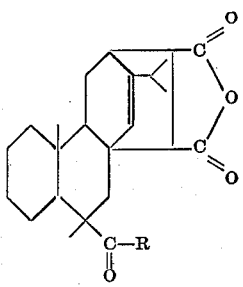

wherein R is selected from the group consisting of

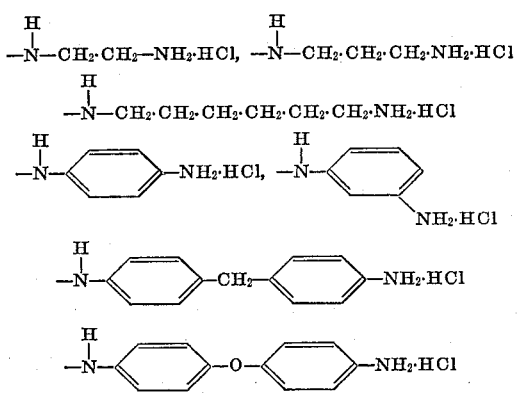

References Cited

Wagner et al.: Synthetic Organic Chemistry, New York—John Wiley and Sons (1953), p. 546.

ALEX MAZEL, Primary Examiner

BERNARD I. DENTZ, Assistant Examiner

U.S. Cl. X.R.

260—78